United States Patent
Riepshoff et al.

(10) Patent No.: US 8,700,637 B2
(45) Date of Patent: Apr. 15, 2014

(54) COMPLEX EVENT PROCESSING ENGINE

(75) Inventors: Robert D. Riepshoff, Troy, IL (US);
Robbie D. Woodrum, Troy, IL (US);
Kyle M. Delap, Fairview Heights, IL (US); Greg A. Wade, Shiloh, IL (US)

(73) Assignee: Lockheed Martin Corporation, Bethesda, MD (US)

( * ) Notice: Subject to any disclaimer, the term of this patent is extended or adjusted under 35 U.S.C. 154(b) by 273 days.

(21) Appl. No.: 12/941,496

(22) Filed: Nov. 8, 2010

(65) Prior Publication Data
US 2012/0117083 A1 May 10, 2012

(51) Int. Cl.
*G06F 7/00* (2006.01)
*G06F 17/30* (2006.01)

(52) U.S. Cl.
USPC ............................... 707/748; 707/694

(58) Field of Classification Search
USPC ......... 707/736, 737, 741, 748, 752, 661, 665, 707/694
See application file for complete search history.

(56) References Cited

U.S. PATENT DOCUMENTS

| | | | |
|---|---|---|---|
| 5,596,712 A | 1/1997 | Tsuyama et al. | |
| 6,502,133 B1 | 12/2002 | Baulier et al. | |
| 6,618,727 B1 * | 9/2003 | Wheeler et al. | 707/748 |
| 6,970,844 B1 * | 11/2005 | Bierenbaum | 705/39 |
| 6,982,708 B1 | 1/2006 | Mah et al. | |
| 7,440,933 B2 | 10/2008 | Abrashkevich et al. | |
| 7,457,728 B2 | 11/2008 | Chen et al. | |
| 7,526,486 B2 * | 4/2009 | Cushman et al. | 1/1 |
| 8,504,733 B1 * | 8/2013 | Iyer et al. | 709/252 |
| 2004/0181554 A1 * | 9/2004 | Heckerman et al. | 707/104.1 |
| 2007/0118545 A1 | 5/2007 | Chandrasekharan et al. | |
| 2007/0208587 A1 * | 9/2007 | Sitaraman | 705/1 |
| 2007/0214136 A1 | 9/2007 | MacLennan et al. | |
| 2008/0091443 A1 * | 4/2008 | Strope et al. | 705/1 |
| 2008/0162210 A1 | 7/2008 | Gu et al. | |
| 2008/0235658 A1 | 9/2008 | Adi et al. | |
| 2009/0031327 A1 | 1/2009 | Nesamoney et al. | |
| 2011/0153622 A1 * | 6/2011 | Bhattal et al. | 707/749 |
| 2011/0179020 A1 * | 7/2011 | Ozzie et al. | 707/723 |

* cited by examiner

*Primary Examiner* — MD. I Uddin
(74) *Attorney, Agent, or Firm* — Ronald E. Prass, Jr.; Prass LLP

(57) ABSTRACT

A method, a data aggregation tool, and a set of instructions are disclosed. A data storage 120 may store a data aggregation tree with at least one entry node, a root node, and an initial entry status level for the at least one entry node. A processor 110 may detect an entry node status level change to a resulting entry status level at the at least one entry node. The processor 110 may aggregate a root node score at a root node based on an entry node score for the at least one entry node.

9 Claims, 11 Drawing Sheets

200

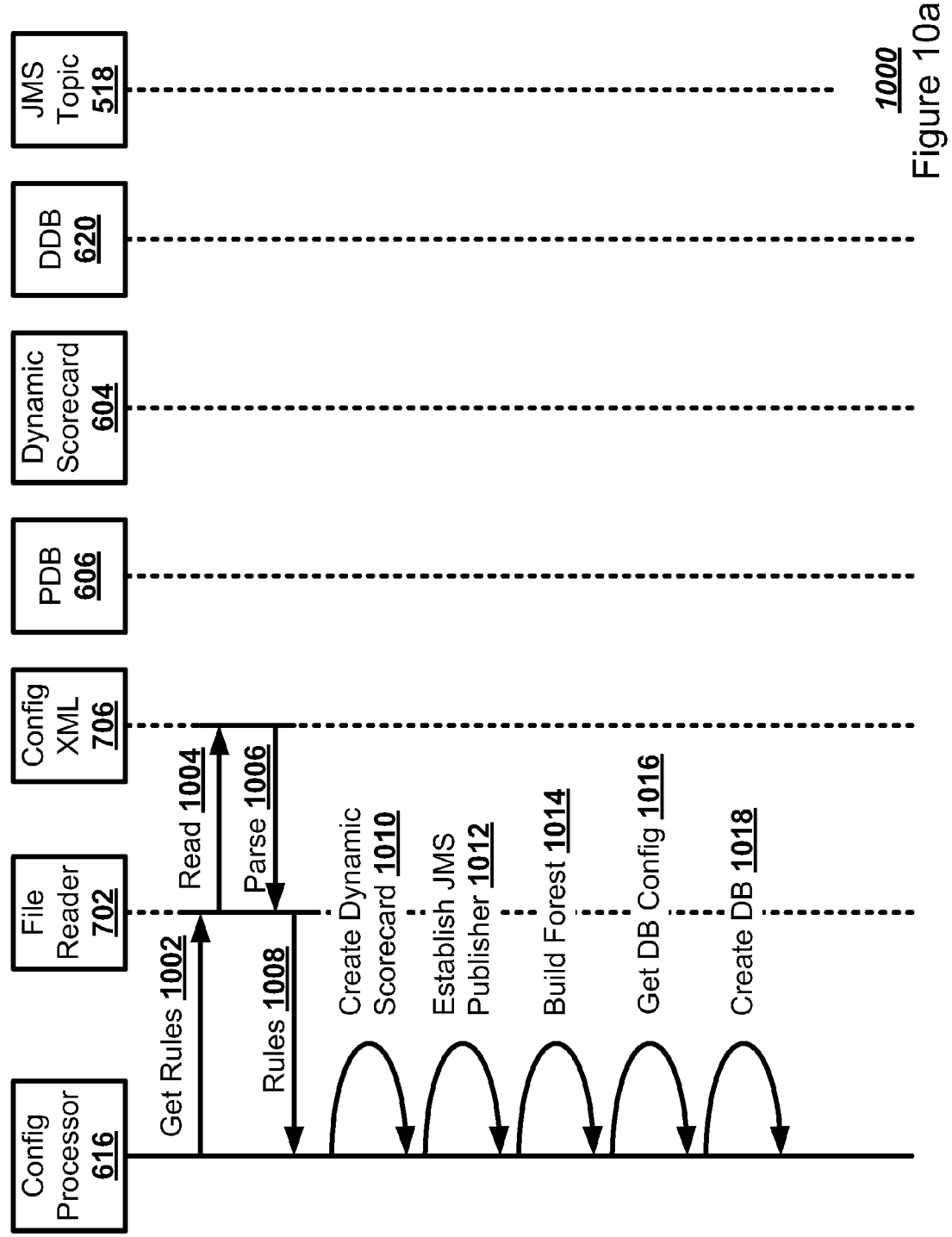

COMPLEX EVENT PROCESSING ENGINE

BACKGROUND OF THE DISCLOSURE

1. Field of the Invention

The present invention relates to a method and system for processing complex events. The present invention further relates to collecting and aggregating data at multiple nodes in a data tree.

2. Introduction

Currently, a computer may organize a set of hierarchical information into a data tree by creating a set of linked nodes. A node may be a structure containing a value, a condition, or a representation of a separate data structure. A terminal node at the bottom of the tree may have a node directly above that node in the tree, referred to as the parent node. A parent node may have a child node below the parent node, and may act as a child node to its own parent node above it. The topmost node in the data structure may be referred to as the root node. The tree may have several layers of internal nodes between the root node and the terminal node. A set of data trees may be referred to as a data forest.

SUMMARY OF THE INVENTION

A method, a data aggregation tool, and a set of instructions are disclosed. A data storage may store a data aggregation tree with at least one entry node, a root node, and an initial entry status level for the at least one entry node. A processor may detect an entry node status level change to a resulting entry status level at the at least one entry node. The processor may aggregate a root node score at a root node based on an entry node score for the at least one entry node.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIGS. 10a-b illustrates, in a flow diagram, one embodiment of a complex event processing engine initialization process.

DETAILED DESCRIPTION OF THE INVENTION

Figure 1:
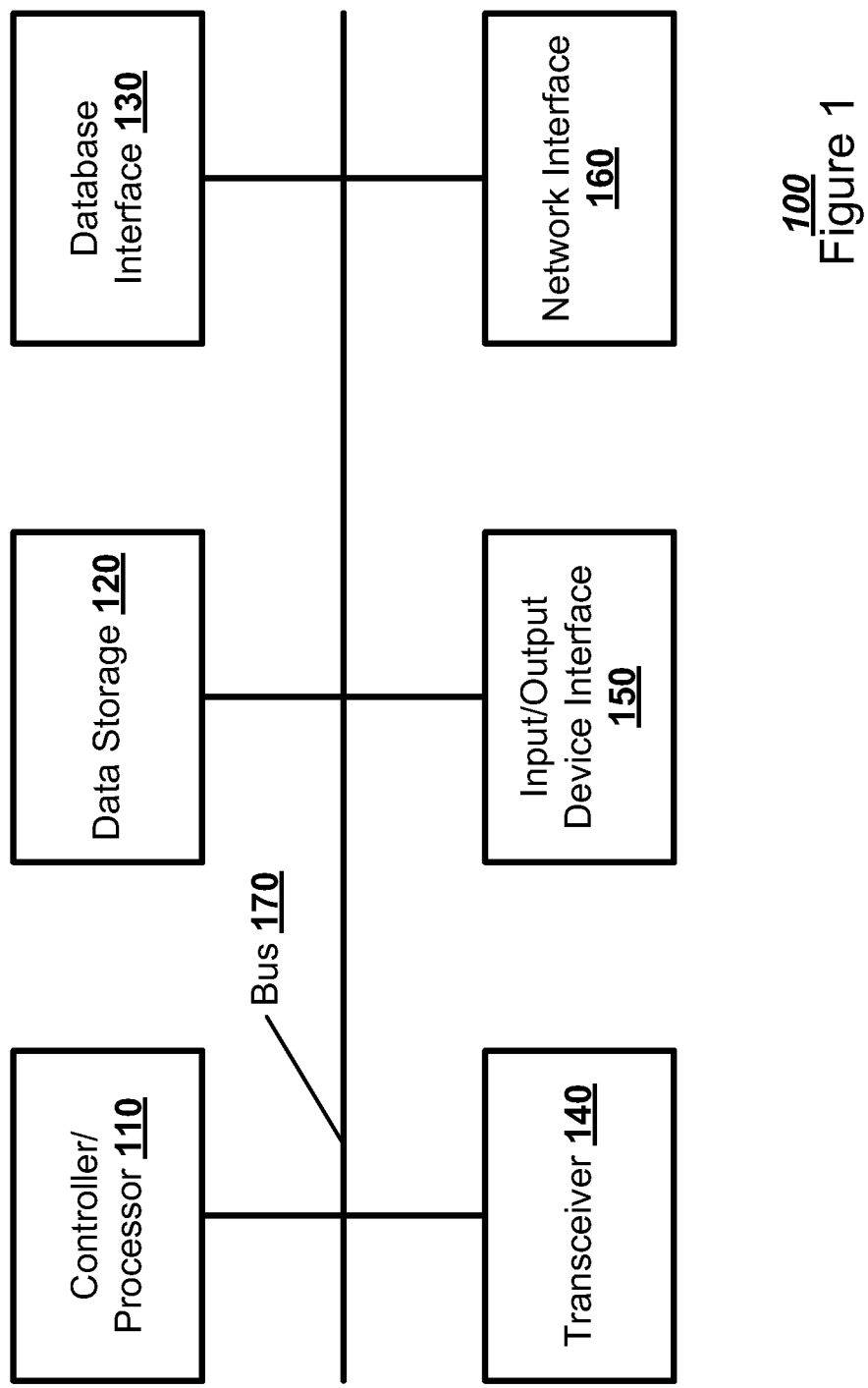
FIG. 1 illustrates, in a block diagram, one embodiment of a computing device.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an electronic device, and a set of instructions, and other embodiments that relate to the basic concepts of the invention. The electronic device may be any manner of computer, mobile device, wireless communication device, or general purpose electronic device. The set of instructions may reside in a storage medium. The set of instructions may be executable by a processor to implement a method for processing digital images.

A method, a data aggregation tool, and a set of instructions are disclosed. A data storage may store a data aggregation tree with at least one entry node, a root node, and an initial entry status level for the at least one entry node. A processor may detect an entry node status level change to a resulting entry status level at the at least one entry node. The processor may aggregate a root node score at a root node based on an entry node score for the at least one entry node.

A lightweight complex event processing (CEP) engine may aggregate and analyze large data sets in a high performance real time fashion to provide 'at a glance' status of a particular activity. The CEP engine may be used to monitor a sea port, a distribution process, or other complex process. The CEP engine may use a node-based tree topology for the aggregation of data to a root node. The CEP engine may execute rules at the node levels and propagated up the tree as data changes state. An agent may feed data collected from complex processes into the lowest level nodes of the data tree. The lowest level nodes of the tree may be virtualized as magic nodes.

The CEP engine may provide a mechanism by which a user may define a tree of data with each node assigned a generic rule that may be used to aggregate data residing in its child nodes. In addition, the CEP engine may assign each node of data user-defined weights and thresholds. The CEP engine may combine generic rules, weights and thresholds to create a specific business rule for the data at that node in the tree. The CEP engine may execute these business rules against the data in the tree to generate dynamic aggregated scores for each node in the tree such that one can actively monitor, and analyze data at each defined level of detail. The tool aggregates the data by assigning color codes to each aggregated node based on the business rules of each node. The color codes may be red to indicate a status of alarm, yellow to indicate a status of warning, or green to indicate a status of normal. During data processing, the tool may aggregate up the tree from a node when the status color of that node changes. This optimization may provide significant performance savings while keeping the status of nodes current when the node data changes. The CEP engine may augment the decision making process by allowing the user to quickly see issues for resolution, drill down to each level of detail, and discover the root cause of the problem. Once the issue has been addressed, the issue may be removed temporarily from the data aggregation, allowing the user to continue to focus on the most urgent issues at hand.

FIG. 1 illustrates a possible configuration of a computing system 100 to act as a CEP engine. The computing system 100 may include a controller/processor 110, a memory 120, a database interface 130, a transceiver 140, input/output (I/O) device interface 150, and a network interface 160, connected through bus 170. The computing system 100 may implement any operating system. Client and server software may be written in any programming language, such as C, C++, Java or Visual Basic, for example. The server software may run on an application framework, such as, for example, a Java® server or .NET® framework The controller/processor 110 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein may be used to implement the disclosed system functions of this invention.

The memory 120 may include volatile and nonvolatile data storage, including one or more electrical, magnetic or optical memories such as a random access memory (RAM), cache, hard drive, or other memory device. The memory may have a cache to speed access to specific data. The memory 120 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 130 may be used by the controller/processor 110 to access the database. Further, the database may maintain information relating to a data forest.

The transceiver 140 may create a connection with a mobile device. The transceiver 140 may be incorporated into the computing system 100 or may be a separate device.

The I/O device interface 150 may be connected to one or more input devices that may include a keyboard, mouse, pen-operated touch screen or monitor, voice-recognition device, or any other device that accepts input. The I/O device interface 150 may also be connected to one or more output devices, such as a monitor, printer, disk drive, speakers, or any other device provided to output data. The I/O device interface 150 may receive a data task or connection criteria from a network administrator.

The network connection interface 160 may be connected to a communication device, modem, network interface card, a transceiver, or any other device capable of transmitting and receiving signals from the network. The network connection interface 160 may be used to monitor a data forest. The components of the computation device 100 may be connected via an electrical bus 170, for example, or linked wirelessly.

Client software and databases may be accessed by the controller/processor 110 from memory 120, and may include, for example, database applications, word processing applications, as well as components that embody the disclosed functionality of the present invention. The computation device 100 may implement any operating system. Client and server software may be written in any programming language. Although not required, the invention is described, at least in part, in the general context of computer-executable executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like.

Figure 2:
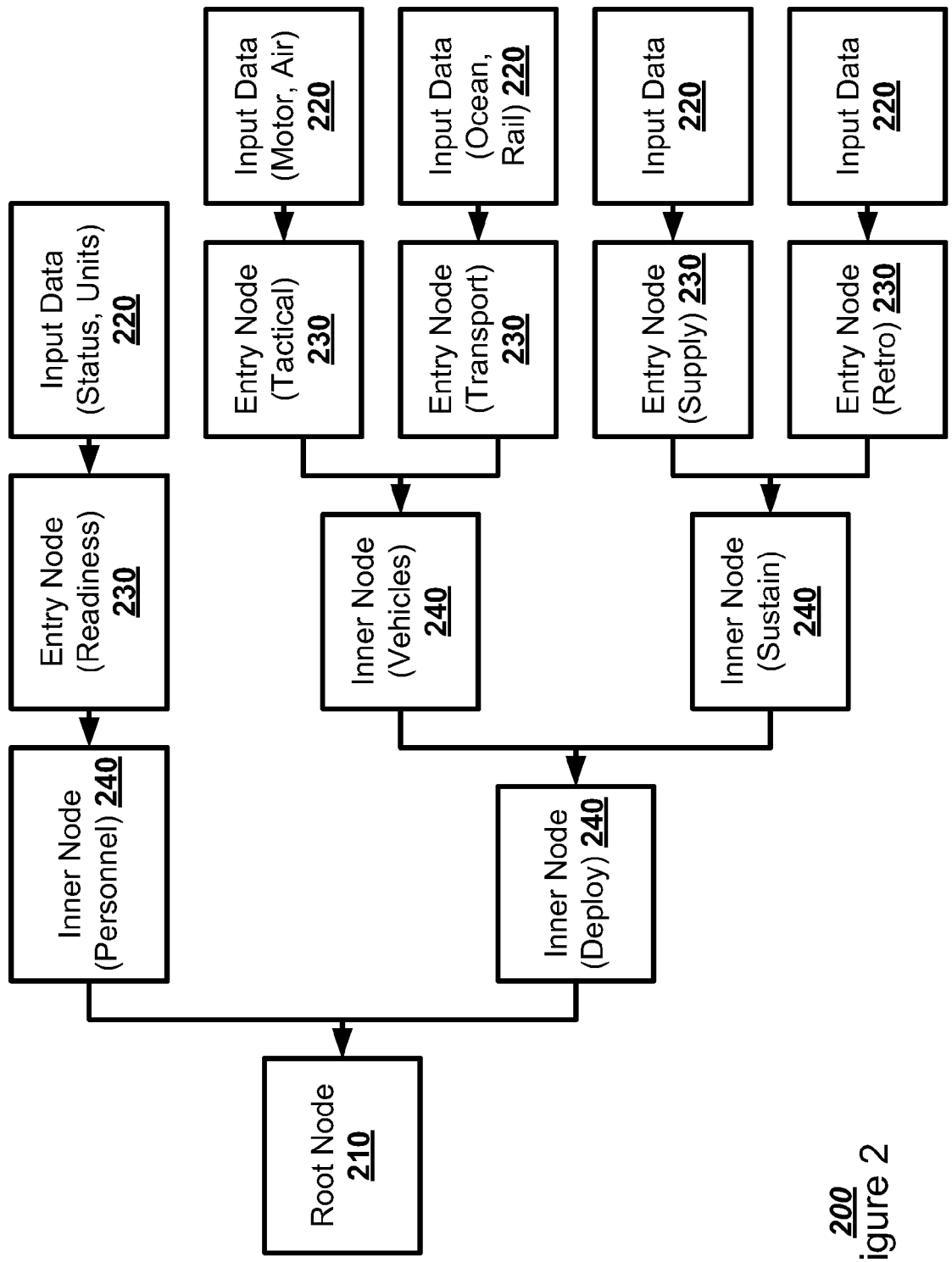
FIG. 2 illustrates, in a block diagram, one embodiment of a data tree.

FIG. 2 illustrates, in a block diagram, one embodiment of a data tree 200. The CEP engine may aggregate data at the root node 210. The CEP engine may receive input data 220 at an entry node 230. Internal nodes 240 may aggregate data from groups of entry nodes 230 before passing the data onto the root nodes 210. For example, a root node 210 may connect to an inner node 240 aggregating personnel data and an inner node 240 aggregating deployment data. The personnel inner node 240 may receive readiness data from an entry node 230 receiving status and unit input data 220. The deployment inner node 240 may receive data from an inner node 240 aggregating vehicle data and an inner node 240 aggregating sustainment data. The vehicular inner node 240 may receive tactical data from an entry node 230 receiving motor and air input data 220 and transport data from an entry node 230 receiving ocean and rail input data 220. The sustainment inner node 240 may receive supply data from an entry node 230 receiving supply unit input data 220 and retro data from an entry node 230 receiving retro unit input data 220.

Figure 3:
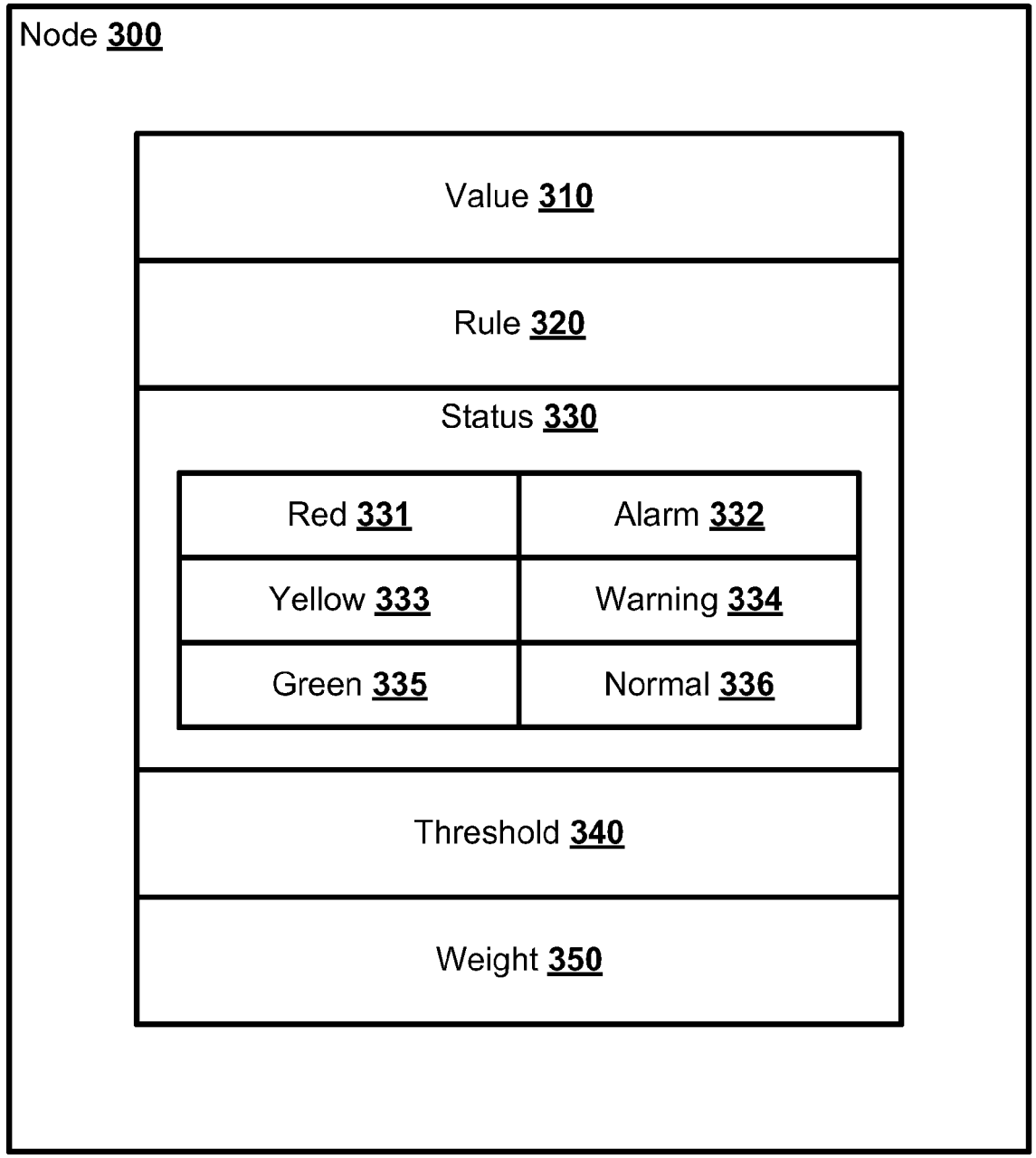
FIG. 3 illustrates, in a block diagram, one embodiment of an entry node.

FIG. 3 illustrates, in a block diagram, one embodiment of a node 300. The node 300 may represent one or more values 310 representing the input data 220 or the data collected. Each node 300 may have a set of one or more business rules 320 indicating any processing to be performed with the values 310. The node 300 may also store a status 330, representing the priority of the data stored at the node 300. The status 330 may be color coded when displaying the data tree to a user. For example, a red status 331 may represent an alarm level 332, a yellow status 333 may represent a warning level 334, and a green status 335 may represent a normal level 336. Additionally, each node 300 may have an assigned threshold 340 for a value change to cause a change in status 330. Each node 300 may have a weight 350 assigned for that node 300 when passing the value of the node 310 to a parent node 300.

Figure 4:
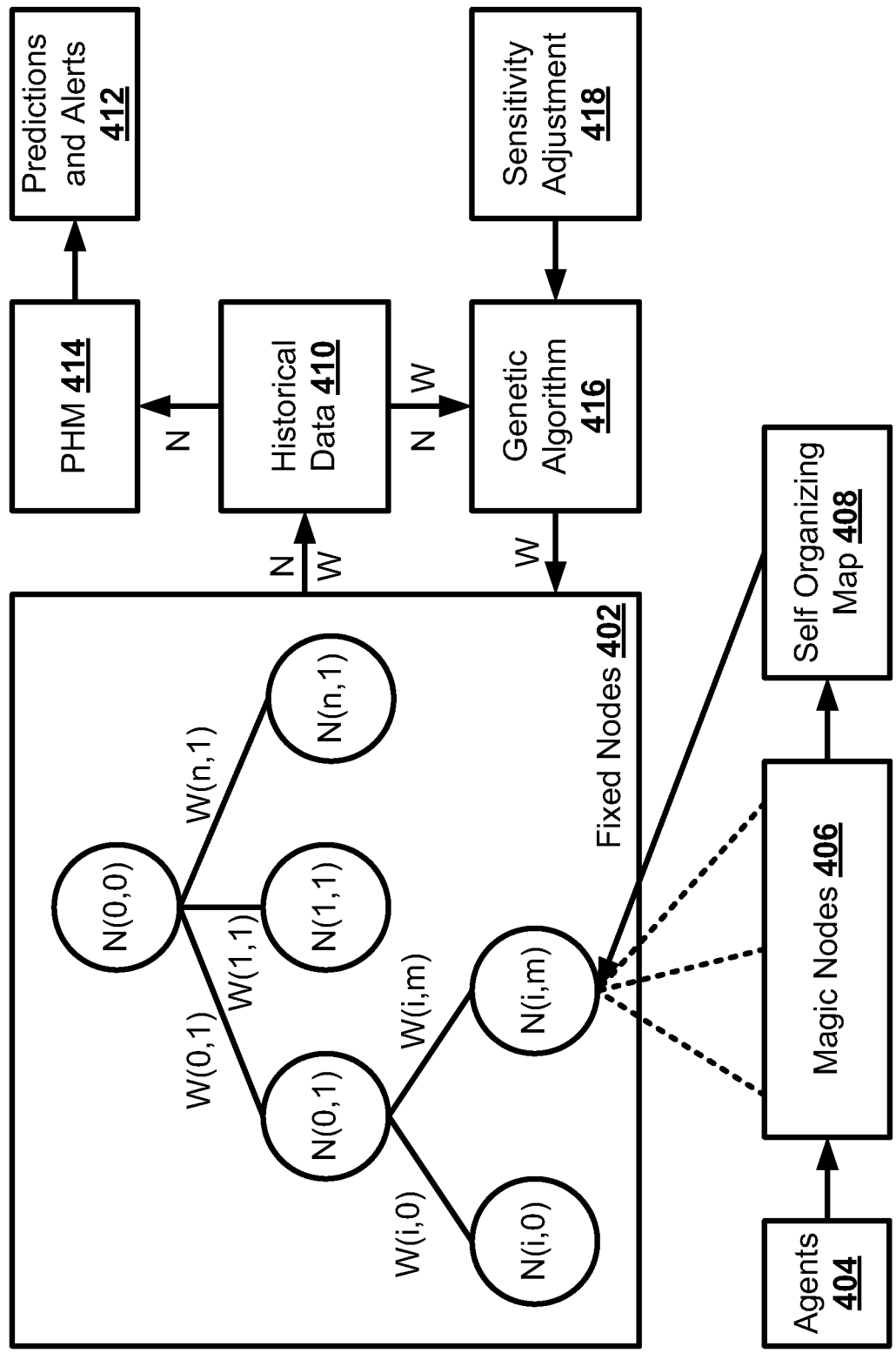
FIG. 4 illustrates, in a block diagram, one embodiment of data aggregation system.

FIG. 4 illustrates, in a block diagram, one embodiment of a logical layout of a data aggregation system 400. The data aggregation system 400 may be a computing device 100, a network of computing devices 100, or other system for processing data. Each software module in the data aggregation system 400 may be enacted by one or more computing devices 100 or by a dedicated circuit. The data aggregation system 400 may maintain a data tree of fixed nodes 402 representing data information that may be consistently maintained across several different systems. A set of data agents 404 may feed a set of input data 220 into a series of magic nodes 406 that may be appended to the data tree of fixed nodes 402. A self organizing map 408 may arrange the magic nodes 406 into a data sub-tree on an as-needed basis. The connection between a parent node and a child node may be weighted based upon user input, environmental circumstances, node statuses, node business rules, and other factors. The data tree may provide both node and weight data to a historical data module 410. A predictions and alerts display 412 may provide predictions about the aggregated data collected by the data aggregation system 400 and alert a user about any changes to that node data. The prediction and alerts module 412 may access the node data stored in the historical data module 412 via a persistent hash map (PHM) 414. Further, a genetic algorithm module 416 may adjust the weights of the data tree. The genetic algorithm module 416 may incorporate node data and weight data from the historical data module 410. The user may adjust the genetic algorithm module 416 via the sensitivity adjustment input 418.

Figure 5:
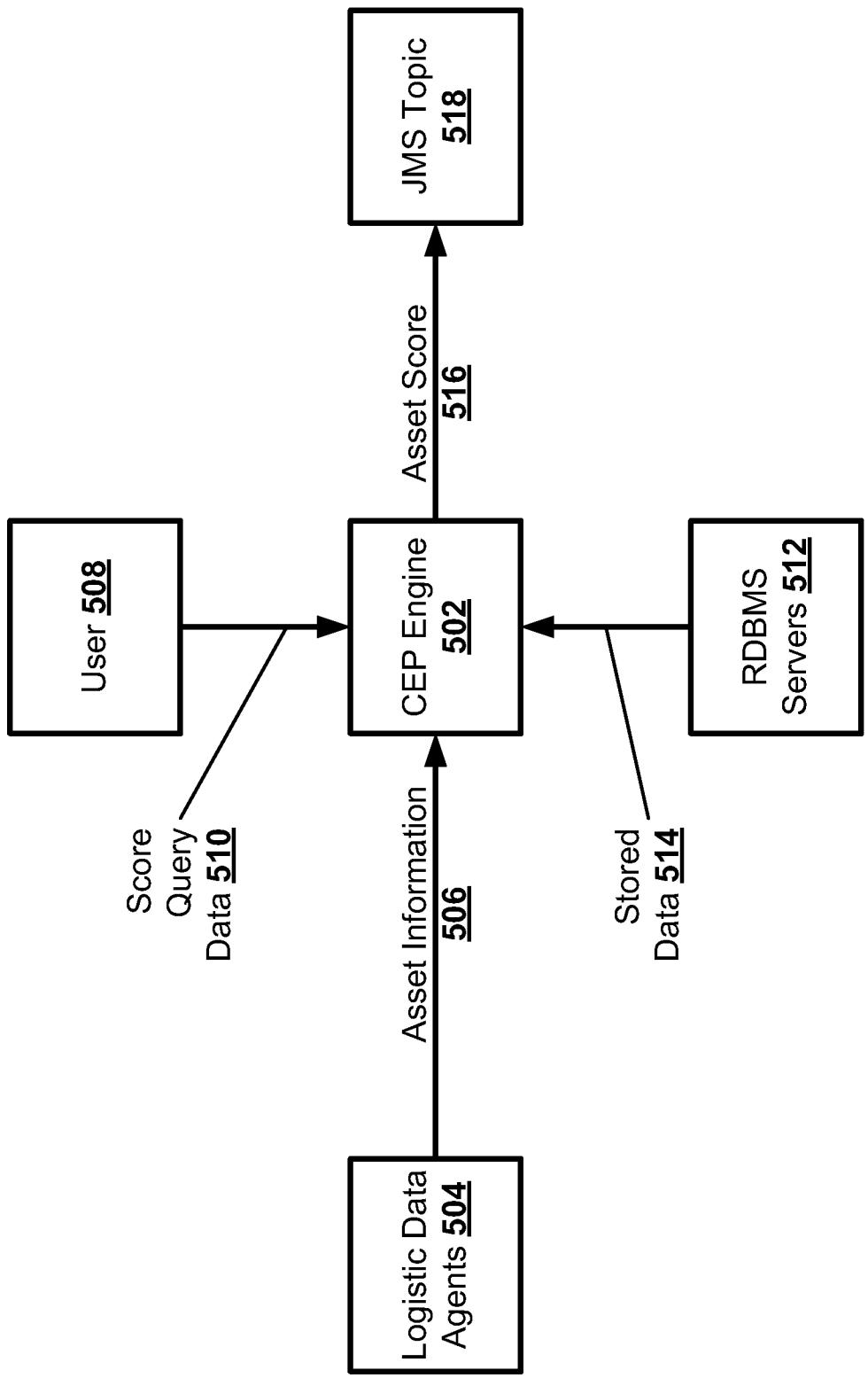
FIG. 5 illustrates, in a block diagram, one embodiment of a data aggregation tool.

FIG. 5 illustrates, in a block diagram, one embodiment of a data aggregation tool 500 that uses a CEP engine 502. The CEP engine 502 may process a large set of varying data using the data aggregation tool 400. A set of logistic data agents 504 may input asset information 506 into the CEP engine 502. A user 508 may provide a set of score query data 510 into the CEP engine 502. A relational database management system (RDBMS) server 512 may provide a set of stored data 514 to the CEP engine 502. The CEP engine 502 may apply the set of stored data 514 and the set of score query data 510 to the asset information 506 to compute an asset score 516 to provide to a Java® messaging service (JMS) topic module 518 for distribution.

Figure 6:
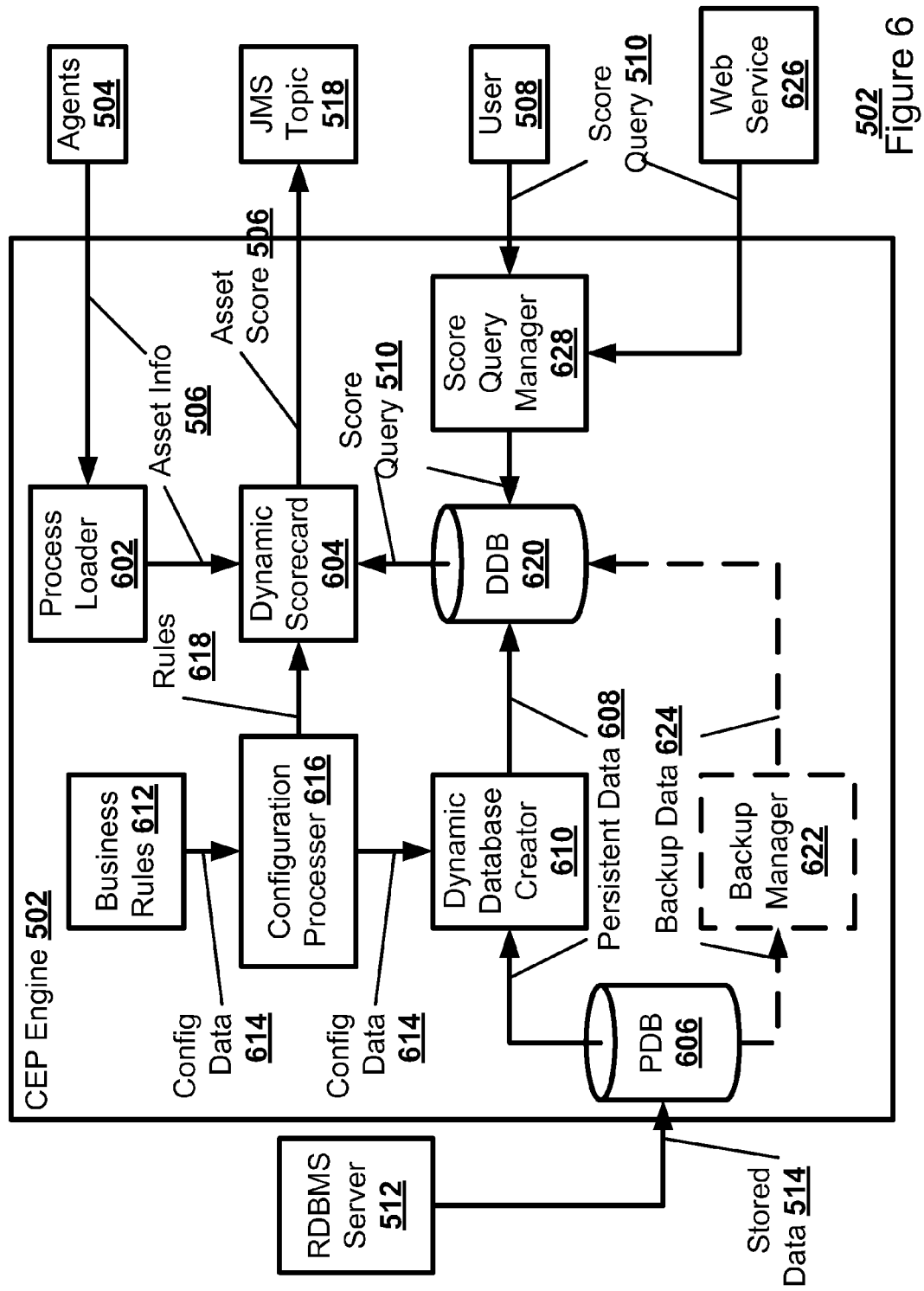
FIG. 6 illustrates, in a block diagram, a detailed embodiment of a complex event processing engine.

FIG. 6 illustrates, in a block diagram, a detailed embodiment of a CEP engine 502. A set of data agents may input asset information 506 into a process loader 602 of the CEP engine 502. The process loader 602 may convert the asset information 506 into a more manageable form, such as extensible markup language (XML), before passing the converted asset information 506 onto a dynamic scorecard 604.

A RDBMS server 512 may pass a set of stored data 514 to a persistent database (PDB) 606 of the CEP engine 502. The PDB 606 may maintain any data that is used throughout the data aggregation process. The PDB 606 may send a set of persistent data 608 to a dynamic database creator 610. A business rules module 612 may provide a set of configuration data 614 to a configuration processor 616. The configuration processor 616 may develop a set of card business rules 618 from the configuration data 614 to be sent to the dynamic scorecard 604, before passing the configuration data 614 on to the dynamic database creator 610. The dynamic database creator 610 may use the persistent data 608 and configuration data 614 to establish a dynamic database (DDB) 620 for providing the persistent data 608 to the dynamic scorecard 604. A backup manager 622 may manage backup data 624 for the PDB 606 and the DDB 620.

A user 508, and possibly a web service 626, may provide score query data 510 to a score query manager 628. The score query manager may 628 may gather the score query data 510 and store it in the DDB 620 for use by the dynamic score card 604. The dynamic scorecard 604 may then calculate an asset score 506 and provide that score 506 to the JMS topic module 518.

Figure 7:
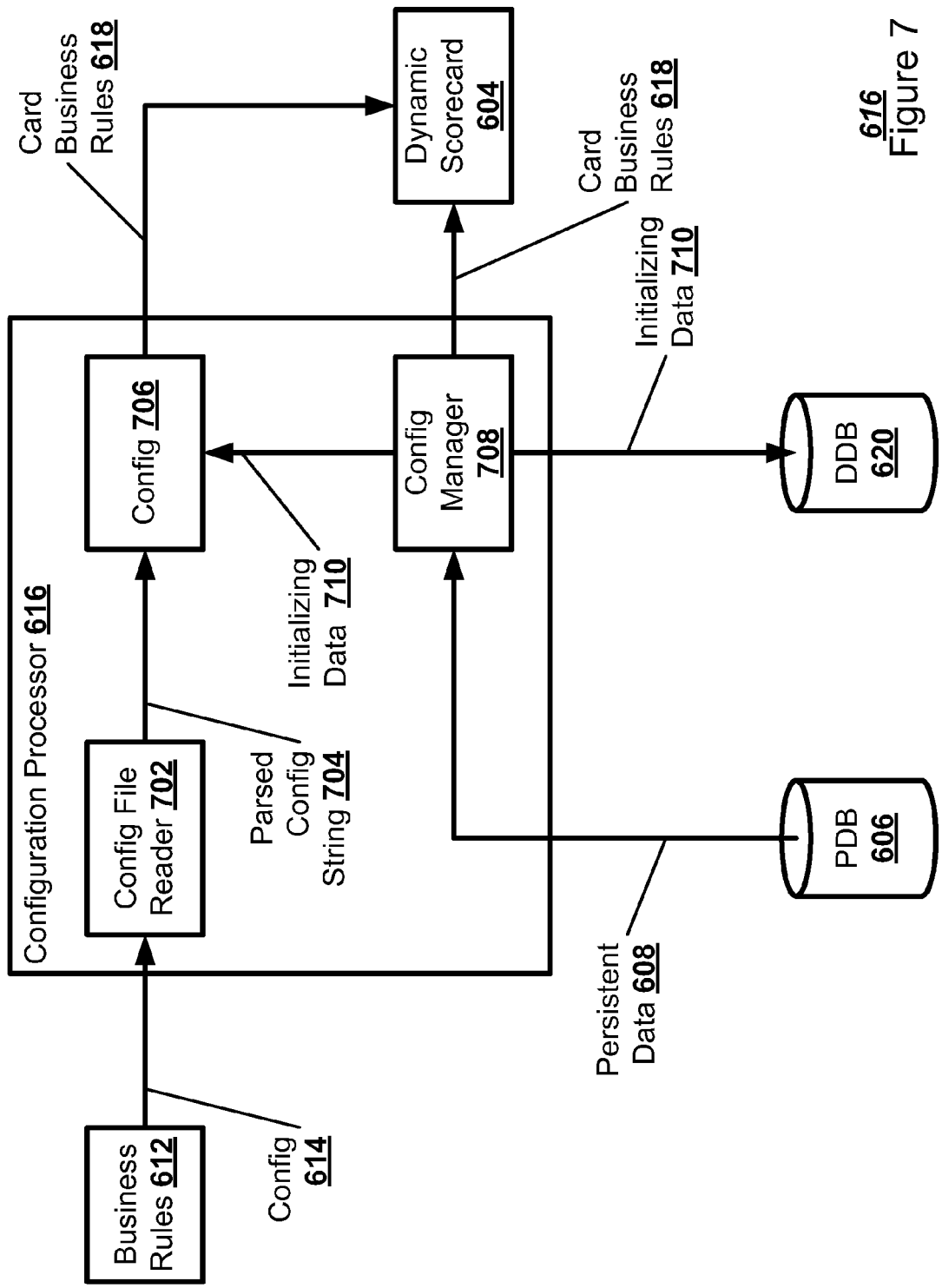
FIG. 7 illustrates, in a block diagram, one embodiment of a configuration processor.

FIG. 7 illustrates, in a block diagram, one embodiment of a configuration processor 616. The business rules module 612 may send configuration data 614 to a configuration file reader 702. The configuration data 614 may be in an XML format. The configuration file reader 702 may parse the configuration data 614 and send the parsed configuration data string 704 to a configurations module 706. The configurations module 706 may generate a set of score card business rules 614 to be sent to the dynamic score care 604. The PDB 606 may send the stored persistent data 608 to a configuration manager 708. The configuration manager 708 may use the persistent data 608 to generate a set of initializing data 710 to send to the DDB 620 and to the configuration module 706. Further, the configuration manager 708 may generate a second set of score card business rules 618 to the dynamic scorecard 604.

Figure 8:
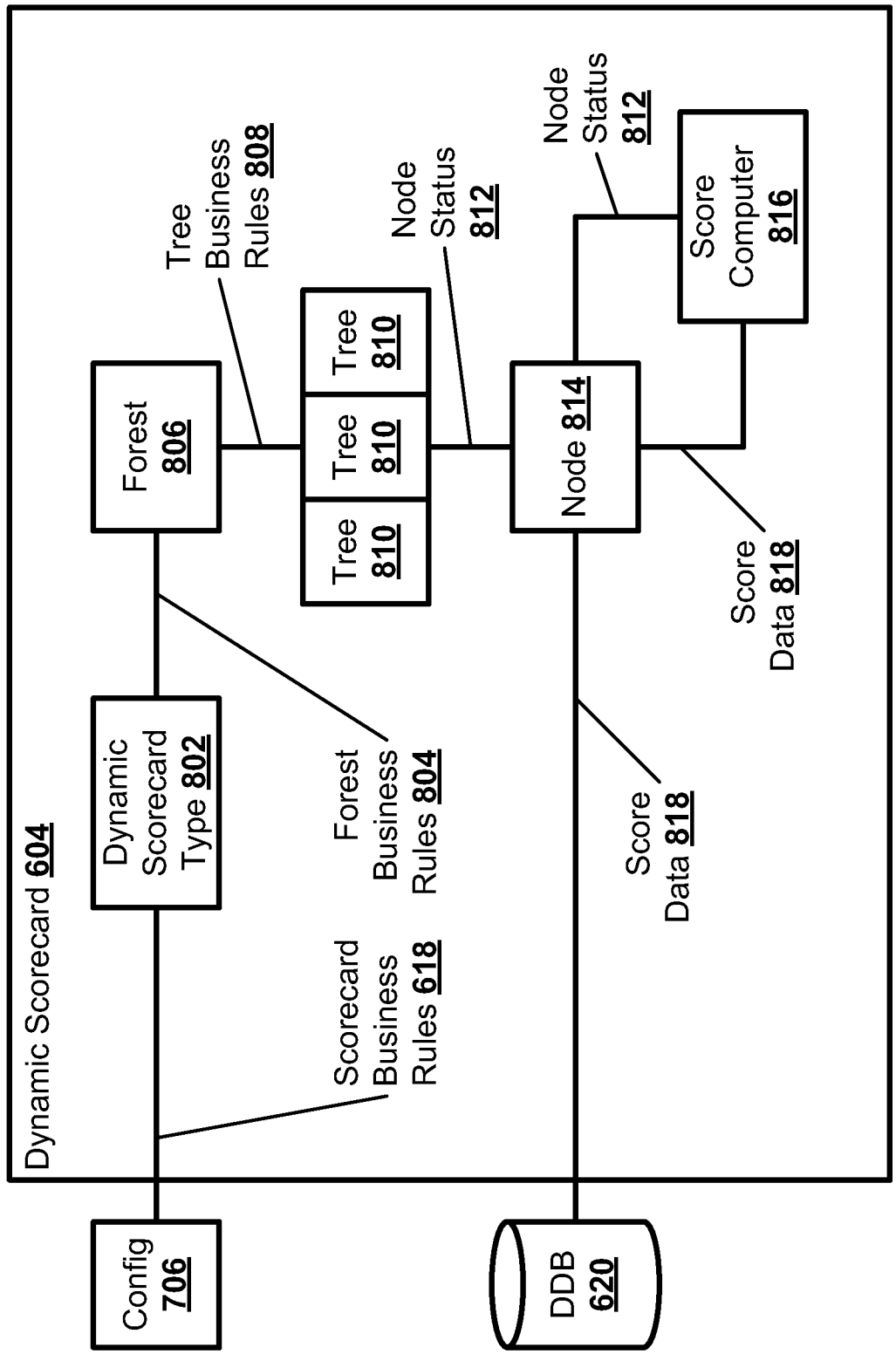
FIG. 8 illustrates, in a block diagram, one embodiment of a dynamic scorecard.

FIG. 8 illustrates, in a block diagram, one embodiment of a dynamic scorecard 604. The configurations module 706 may send a set of scorecard business rules 618 to a dynamic scorecard type module 802. The dynamic scorecard type module 802 may parse the scorecard business rules 618 to develop a set of forest business rules 804 to send to a forest module 806. The forest module 806 may parse the set of forest business rules 804 to develop a set of tree business rules 808 to send to a tree module 810. The tree module 810 may use the tree business rules 808 to calculate a node status 812 to send to a node module 814. The node module 814 may send the node status 812 to a score computer 816. The score computer 816 may calculate a score data 818. The score computer 816 may send the score data 818 to be stored in the DDB 620 via the node module 814.

Figure 9:
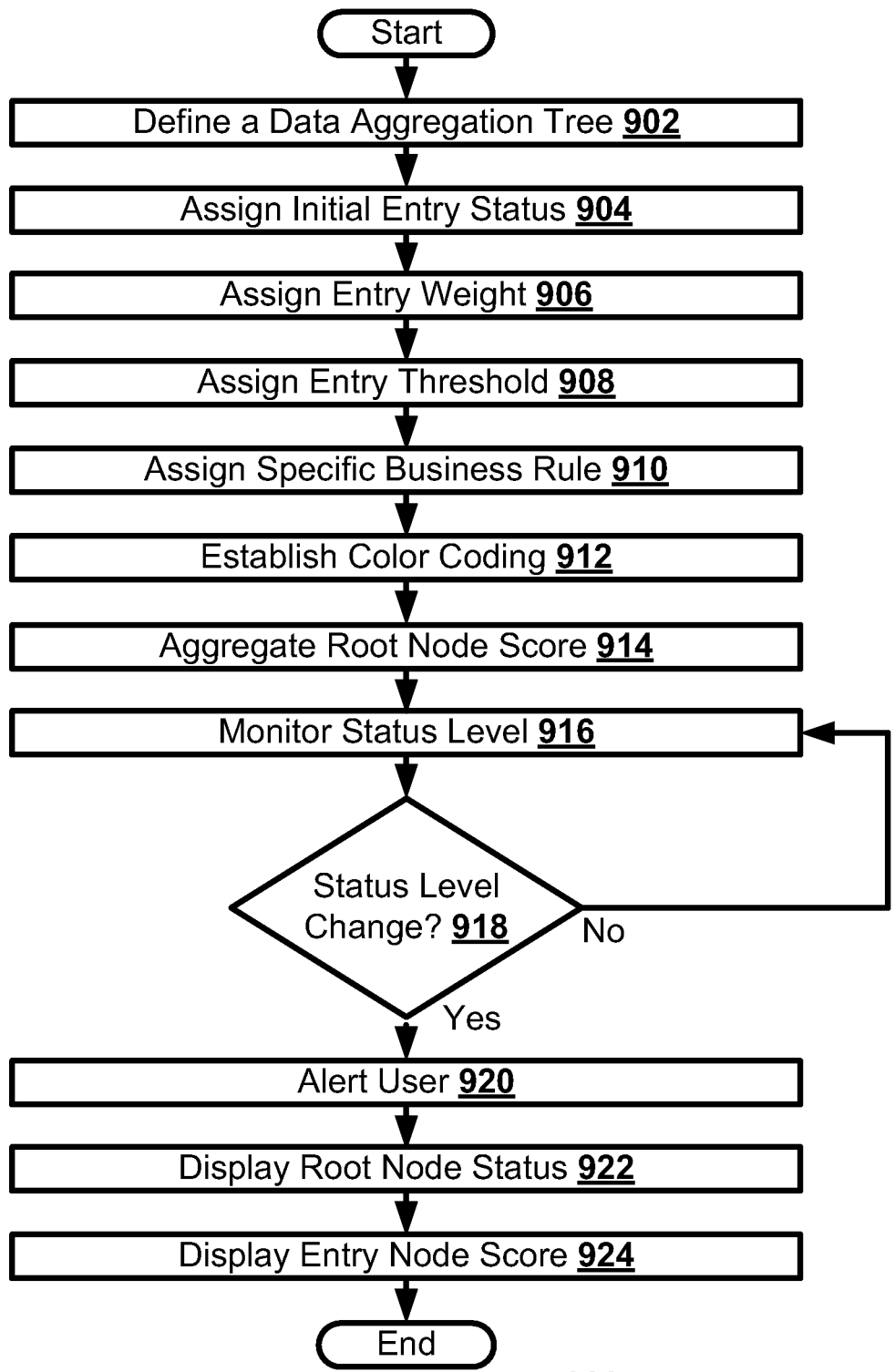
FIG. 9 illustrates, in a flowchart, one embodiment of a method for aggregating data.

FIG. 9 illustrates, in a flowchart, one embodiment of a method 900 for aggregating data using the complex data aggregation tool 400. The complex data aggregation tool 400 may define a data aggregation tree with at least one entry node (Block 902). The complex data aggregation tool 400 may assign an initial entry status level to the at least one entry node 230 (Block 904). The complex data aggregation tool 400 may assign an entry weight to the at least one entry node 230 (Block 906). The complex data aggregation tool 400 may assign an entry threshold to the at least one entry node 230 (Block 908). The complex data aggregation tool 400 may assign a specific business rule to the at least one entry node 230 (Block 910). The complex data aggregation tool 400 may establish a color coding for displaying a resulting entry status level 330 (Block 912). The complex data aggregation tool 400 may aggregate a root node score at a root node 210 based on an entry node score for the at least one entry node 230 (Block 914). The complex data aggregation tool 400 may monitor an entry node 230 for an entry status level change (Block 916). If the complex data aggregation tool 400 detects an entry status level change to a resulting entry status level (Block 918), the complex data aggregation tool 400 may alert the user to the entry node status level change (Block 920). The complex data aggregation tool may again aggregate the root node score at the root node upon the entry node status level change. The complex data aggregation tool 400 may display the root node status to the user (Block 922). The complex data aggregation tool 400 may display the entry node score to the user (Block 924).

Figure 10B:
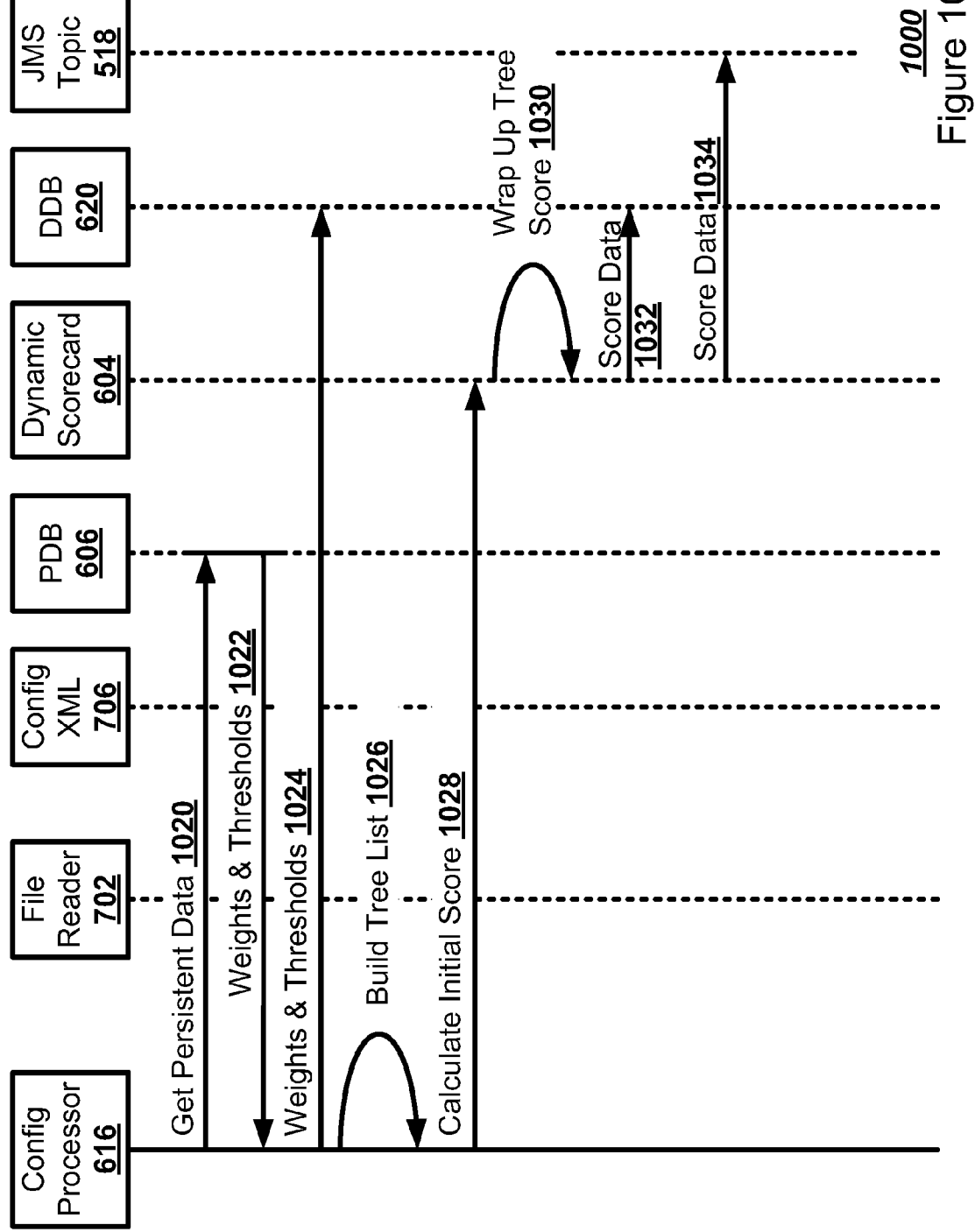

FIGS. 10a-b illustrates, in a flow diagram, one embodiment of a complex event processing engine initialization process 1000. In FIG. 10a, the configuration processor 616 may request a set of business rules from the configuration file reader 702 (Action 1002). The configuration file reader 702 may request the configuration XML data 614 from the configuration module 706 (Action 1004). The configuration file reader 702 may send the parsed configuration XML string 704 from the configuration module 706 (Action 1006). The configuration file reader 702 may send the business rules to the configuration processor 616 (Action 1008). The configuration processor 616 may create the dynamic scorecard 604 (Action 1010). The configuration processor 616 may establish a JMS publisher (Action 1012). The configuration processor 616 may build a data forest (Action 1014). The configuration processor 616 may get the database configurations for the PDB 606 and DDB 620 (Action 1016). The configuration processor 616 may then create a PDB 606 and a DDB 620 (Action 1018).

Continuing in FIG. 10b, the configuration processor 616 may request a set of persistent data 608 from the P6 606 (Action 1020). The PDB 606 may send a set of weights and thresholds for the data forest to the configuration processor (Action 1022). The configuration processor 616 may send the set of weights and thresholds to the DDB 620 (Action 1024). The configuration processor 616 may build a tree list for each data tree in the data forest (Action 1026). For each data tree on the tree list, the configuration processor 616 may use the dynamic scorecard 604 to calculate the initial data score for each tree (Action 1028). The dynamic scorecard 604 may wrap up the tree score for each tree (Action 1030). The dynamic scorecard 604 may send that tree score data to the DDB 620 (Action 1032). The dynamic scorecard 604 may also send the tree score data to the JMS topic module 518 (Action 1034).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method to aggregate data using a complex event processing engine, comprising:
    defining in real time, with a processor, a data aggregation tree, the data aggregation tree having at least one parent node and at least one child node associated with the at least one parent node, a self-organizing map arranging nodes into a data sub-tree on an as-needed basis and connections between the at least one parent node and the at least one child node being weighted based on at least one of user inputs, environmental circumstances, node statuses and node business rules to determine a weight value, the processor using a dynamic scorecard to calculate an initial data score for each data aggregation tree;
    determining, with the processor, the weight value assigned to the at least one child node;
    determining, with the processor, a threshold level assigned to the at least one child node, the threshold level being associated with child node data;
    assigning at least one generic rule to the at least one parent node, the at least one generic rule being associated with aggregating child node data from the at least one child node;
    assigning a specific business rule to the at least one child node based on the weight value, the threshold value, and the at least one generic rule;
    processing the child node data to determine a child node score for the child node based on the specific business rule and the child node data;
    assigning a status level of the at least one child node indicating a degree of priority based on the child node score;
    monitoring an entry status level to detect change in the status level triggering the display of an alert to a user, the change in the status level of the at least one child node being based on the specific business rule and a change in the child node-data;
    determining, with the processor, a parent node score at the parent node based on an aggregation of one or more of the child node data, parent node data, and the at least one child node score, the aggregation of the parent node score being re-initiated when the change in the status level of the at least one child node is detected; and
    categorizing, with the processor, the status level of the child node to indicate a degree of priority by way of a color coding of the categorized status level of the child node, the color coding representing an alarm level, a warning level, and a normal level.

2. The method of claim 1, further comprising:
    storing one or more of the child data, the determined change in child node data, and the weight value; and
    adjusting the weight value by applying a genetic algorithm that is based on the child node data, the determined change child node data, and the weight value.

3. The method of claim 1, further comprising:
    presenting a drill down display of the data aggregation tree to facilitate determining a cause of the change in the status level of the at least one child node.

4. A data aggregation tool, comprising:
    a data storage that stores a data aggregation tree having at least one parent node and at least one child node associated with the at least one parent node; and
    a processor that is programmed to:
        define in real time a data aggregation tree, the data aggregation tree having at least one parent node and at least one child node associated with the at least one parent node, a self-organizing map arranging nodes into a data sub-tree on an as-needed basis and connections between the at least one parent node and the at least one child node being weighted based on at least one of user inputs, environmental circumstances, node statuses and node business rules to determine a weight value, the processor using a dynamic scorecard to calculate an initial data score for each data aggregation tree;

determine the weight value assigned to the at least one child node;

determine a threshold level assigned to the at least one child node, the threshold level being associated with child node data;

assign at least one generic rule to the at least one parent node, the at least one generic rule being associated with aggregating child node data from the at least one child node;

assign a specific business rule to the at least one child node based on the weight value, the threshold value, and the at least one generic rule;

process the child node data to determine a child node score for the child node based on the specific business rule and the child node data;

assign a status level of the at least one child node indicating a degree of priority to be assigned based on the child node score;

monitoring an entry status level to detect change in the status level triggering the display of an alert to a user, the change in the status level of the at least one child node being based on the specific business rule and a change in the child node data;

determine a parent node score at the parent node based on an aggregation of one or more of the child node data, parent node data, and the at least one child node score, the aggregation of the parent node score being re-initiated when the change in the status level of the at least one child node is detected; and categorize the status level of the child node to indicate a degree of priority by way of a color coding of the categorized status level of the child node, the color coding representing an alarm level, a warning level, and a normal level.

5. The data aggregation tool of claim 4, wherein the processor is further programmed to:

store one or more of the child data, the determined change in child node data, and the weight value; and adjust the weight value by applying a genetic algorithm based on the child node data, the determined change child node data, and the weight value.

6. The data aggregation tool of claim 4, wherein the processor is further programmed to present a drill down display of the data aggregation tree on a display to facilitate determining a cause of the change in the status level of the at least one child node.

7. A non-transitory storage medium on which is recorded instructions that, when executed by a processor, cause the processor to implement a method for processing complex events, the method comprising:

defining in real time a data aggregation tree, the data aggregation tree having at least one parent node and at least one child node associated with the at least one parent node, a self-organizing map arranging nodes into a data sub-tree on an as-needed basis and connections between the at least one parent node and the at least one child node being weighted based on at least one of user inputs, environmental circumstances, node statuses and node business rules to determine a weight value, the processor using a dynamic scorecard to calculate an initial data score for each data aggregation tree;

determining the weight value assigned to the at least one child node;

determining a threshold level assigned to the at least one child node, the threshold level being associated with child node data;

assigning at least one generic rule to the at least one parent node, the at least one generic rule being associated with aggregating child node data from the at least one child node;

assigning a specific business rule to the at least one child node based on the weight value, the threshold value, and the at least one generic rule;

processing the child node data to determine a child node score for the child node based on the specific business rule and the child node data;

assigning a status level of the at least one child node indicating a degree of priority based on the child node score;

monitoring an entry status level to detect change in the status level triggering the display of an alert to a user, the change in the status level of the at least one child node being based on the specific business rule and a change in the child node data;

determining a parent node score at the parent node based on an aggregation of one or more of the child node data, parent node data, and the at least one child node score, the aggregation of the parent node score being re-initiated when the change in the status level of the at least one child node is detected; and categorizing the status level of the child node to indicate a degree of priority by way of a color coding of the categorized status level of the child node, the color coding representing an alarm level, a warning level, and a normal level.

8. The non-transitory computer readable medium of claim 7, the method further comprising:

storing one or more of the child data, the determined change in child node data, and the weight value; and adjusting the weight value by applying a genetic algorithm based on the child node data, the determined change child node data, and the weight value.

9. The non-transitory computer readable medium of claim 7, the method further comprising:

presenting a drill down display of the data aggregation tree to facilitate determining a cause of the change in the status level of the at least one child node.

* * * * *